United States Patent [19]
Oh et al.

[11] Patent Number: 5,959,703
[45] Date of Patent: Sep. 28, 1999

[54] APPARATUS AND METHOD FOR REMOVING ERROR DATA DECODING DELAY IN A DTV

[75] Inventors: Dae-Il Oh, Kyoungki-do; Eung-Ryeol Kim, Seoul; Dae-Hyun Kim, Seoul; Won-Jin Lee, Seoul, all of Rep. of Korea

[73] Assignee: Hyundai Electronics Ind Co., Ltd., Kyoungki-do, Rep. of Korea

[21] Appl. No.: 08/902,141

[22] Filed: Jul. 30, 1997

[30] Foreign Application Priority Data

Jan. 20, 1997 [KR] Rep. of Korea ......................... 97-1528

[51] Int. Cl.$^6$ ....................................................... H04N 7/64
[52] U.S. Cl. ...................... 348/845.1; 348/513; 348/518; 348/845.3
[58] Field of Search ............................. 348/845.1, 845.3, 348/513, 518

[56] References Cited

U.S. PATENT DOCUMENTS 5,745,185  4/1998  Portron ................................... 348/512
5,798,804  8/1998  Okitsu .................................... 348/518
5,812,201  9/1998  Yoo ..................................... 348/845.3
5,828,414  10/1998  Perkins ................................ 348/845.3

*Primary Examiner*—Howard Britton
*Attorney, Agent, or Firm*—McAulay Nissen Goldberg Kiel & Hand, LLP

[57] ABSTRACT

In an error data removing apparatus and method by decoding delay in a DTV system which employs a decoder of the VSB standard, respective segments or respective fields are divided into area 1 and area 2 using a starting point of decoded data as a reference to provide the decoded data of said area 1 section without involving delay and provide the decoded data of said area 2 section by delaying as long as a sync signal. A memory is utilized as the decoded data delay apparatus, and at this time, a value of a counter used for generating an address for reading/writing of the memory is utilized to delay the segment sync signal and field sync signal as required without separately using flip-flop or memory.

25 Claims, 11 Drawing Sheets

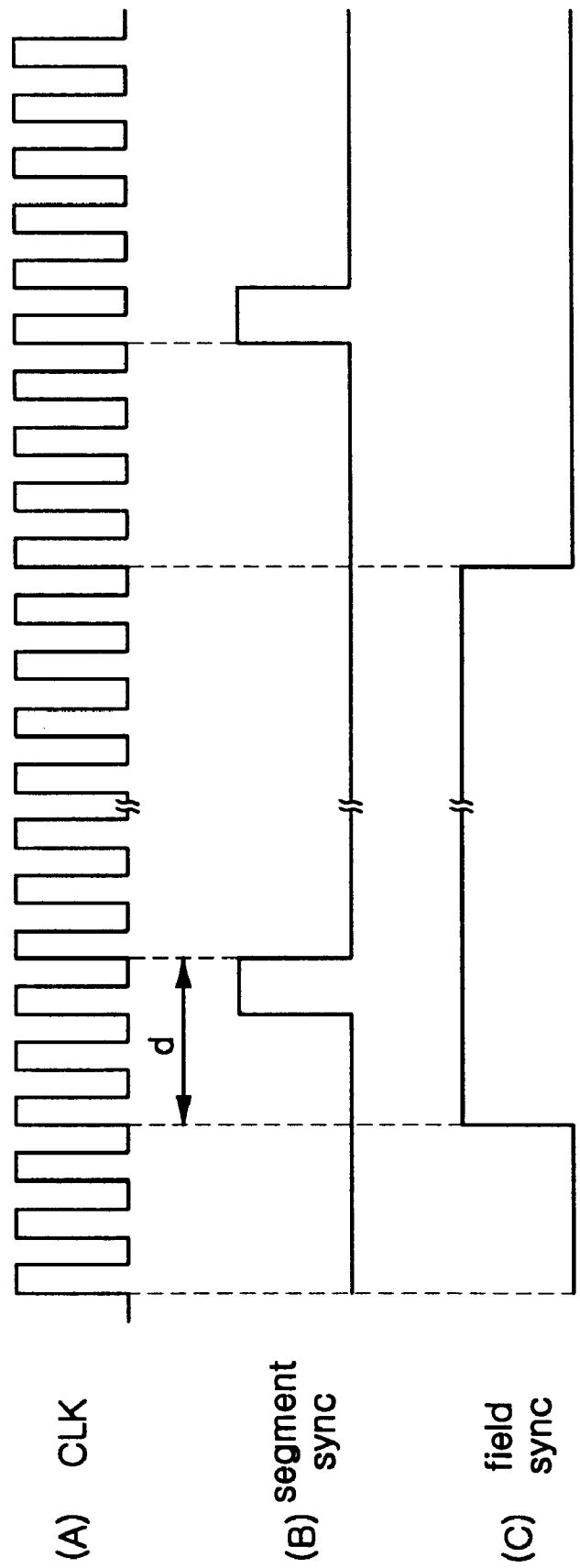

ive,703

APPARATUS AND METHOD FOR REMOVING ERROR DATA DECODING DELAY IN A DTV

BACKGROUND OF THE INVENTION

1. Field of the Invention

The present invention relates to a DTV(Digital television), and more particularly to an apparatus and method for removing error data by decoding delay in a DTV capable of performing error data removal and sync signal delay resulting from the decoding delay produced in a digital data receiver such as a decoder (Viterbi decoder) or deinterleaver of 8 or 16 vestigial sidebands (VSB) standard suggested as a DTV transmission system by the ATSC (Advanced Television Systems Committee).

2. Description of the Prior Art

FIG. 1 is a block construction view showing a forward error correction encoder of 8VSB standard suggested as the United States DTV transmission system by the ATSC. Here, in-data is received into a random numbering device 1 to be random and is encoded in a Reed-Solomon encoder 2. An output of Reed-Solomon encoder 2 is interleaved in an interleaver 3 for removing a burst error, and out-data is obtained by being subjected to a trellis encoding in a trellis encoder 4.

FIG. 2 is a block construction view showing the forward error correction decoder, in which input data in-data is decoded in a trellis decoder 5 to be deinterleaved in a deinterleaver 6. An output of deinterleaver 6 is decoded in a Reed-Solomon decoder 7, so that out-data to be random by random numbering device 1 is to be reversely random in a reverse-random numbering device 8 to be provided as the original data. Here, trellis decoder 5 is embodied by the Viterbi decoding algorithm which has an attribute for decoding by performing the back-tracing after receiving data of a prescribed quantity to have the decoding delay between the input and output of trellis decoder 5.

FIG. 3 illustrates the internal construction of deinterleaver 6, in which the output delay with respect to the input of deinterleaver 6 appears in proportion to the depth of interleaver 3.

FIG. 4 shows a data frame of the VSB standard by the ATSC, in which one segment consists of 832 symbols, and initial four symbols of each segment are a segment sync signal and 828 symbols are data. One field consists of data of 312 segments and a field sync signal of one segment, and one frame consists of two fields. Also, four symbols constitute one byte in 8VSB, and 2 symbols constitute one byte in 16VSB. Once the in-data stream having the above-stated format is received into trellis decoder 5 of the forward error correcting decoder shown in FIG. 2, the decoded data is provided from trellis decoder 5 after delaying by a prescribed period. The decoded data provided at this time involves a time differential as long as the sync signal of the input side and decoding delay time as shown in FIG. 5. The decoding delay may be indicated by a delay of one segment unit using the field sync as a reference and a delay of one byte unit using the segment sync as a reference. additionally, as shown in FIG. 5B, error data as long as the sync signal interval exists in the midst of the decoding output to incite the same problem in deinterleaver 6 as well as trellis decoder 5 except for the length of the delay time.

The time differential between the sync signal and decoding output can be solved by delaying the sync signal as long as the decoding delay time by using a flip-flop, but the use of the flip-flop incurs considerable cost in allotting the chip area and clock allocation when the decoding delay time is excessively long.

In case of the 8VSB standard by the ATSC, the trellis decoder delay is more than 250 clocks and deinterleaver delay is more than 10,000 clocks. For this reason, the delay of the sync signal by the flip-flop wastes the chip area and induces a serious problem in allotting clocks.

Furthermore, a memory may be utilized to economize the chip area, which, however, has a drawback of requiring a separate logic circuit for generating addresses of the memory.

SUMMARY OF THE INVENTION

The present invention is devised to solve overall problems heretofore incurring in the conventional decoder of 8VSB standard by the ATSC. Therefore, it is an object of the present invention to provide an apparatus and method for removing error data by decoding delay in a DTV, wherein error data existing in decoded data stream is eliminated by using a buffer.

More specifically, since the error data to be eliminated in case of the 8VSB of the ATSC concurs with the length of a field sync signal and a segment sync signal, the error data in the quantity of the field sync signal is removed by using a register, and one segment data in the quantity of the field sync by embodying the buffer using a memory.

In an error data removing apparatus and method by decoding delay in a DTV according to the present invention in order to the above and other objects, respective segments or respective fields are divided into area 1 and area 2 using a starting point of decoded data as a reference to provide the decoded data of said area 1 section without involving delay and provide the decoded data of said area 2 section by delaying as long as a sync signal.

Also, a memory is utilized as the decoded data delay apparatus. At this time, a value of a counter used for generating an address for reading/writing of the memory is utilized to delay the segment sync signal and field sync signal as required without separately using flip-flop or memory.

That is, the staring point of the decoded data provided by being delayed as compared with the sync signal is used as a reference point of generating the control signal for controlling the memory, and the area 1 and area 2 are divided as shown in FIG. 5C by using a starting point of the decoded data as a reference, thereby generating the control signal. Here, the area division utilizes the value of the counter.

The number of the required counter is as many as the number of sync signals, and the segment sync signal concurring with the starting point of the decoded data can be produced by using the byte counter value. Also, the field sync signal is generated by using the segment counter value.

A buffer for removing the error data may be embodied by two single port memories, one dual port memory or one single port memory.

At this time, the memory size corresponds to the data quantity as much as the sync signal section to the data quantity as much as an adjacent plurality of sync signal sections when the plurality of sync signals are adjacent to one another. 208 byte memory corresponding to 832 sync signal symbols are required in case of the 8VSB standard, and 416 byte memory are required in case of the 16VSB. The addresses and control signals of the memory are generated by using respective counters.

BRIEF DESCRIPTION OF THE DRAWINGS

The above objects and other advantages of the present invention will is become more apparent by describing in detail preferred embodiments thereof with reference to the attached drawings in which:

FIG. 8B shows I/O waveforms of respective parts shown in FIG. 8A;

DETAILED DESCRIPTION OF THE PREFERRED EMBODIMENT

Figure 6:
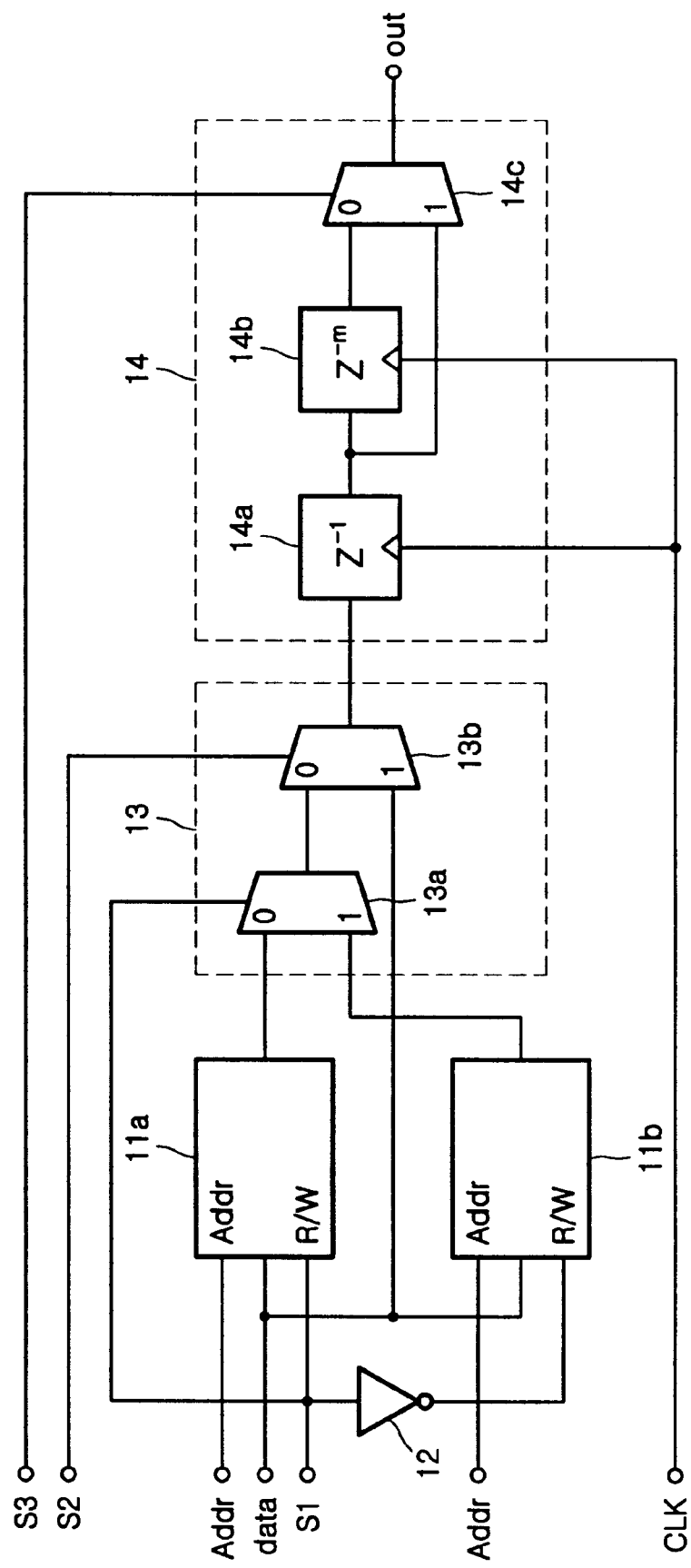
FIG. 6 shows a first embodiment of an error data removing apparatus by decoding delay in a DTV according to the present invention.

FIG. 6 shows a first embodiment of an error data removing apparatus by decoding delay in a DTV according to the present invention, which includes memory parts 11a and 11b for alternately read/write data received by means of a first control signal S1 for controlling the read/write operations, an inverter 12 for phase-shifting first control signal S1 to lead memory parts 11a and 11b to operate in different modes from each other, and a first data error removing part 13 for eliminating an data error resulting from the decoding delay by a field sync signal in out-data of memory parts 11a and 11b by means of a second control signal that eliminates the error data due to the field sync signal and first control signal S1. Also, a second data error removing part 14 eliminates an data error resulting from the decoding delay by a segment sync signal in an output of first data error removing part 13 by means of a third control signal S3 that eliminates the data error due to the segment sync signal.

In the above-described parts, first data error removing part 13 is formed by a multiplexer 13a for selecting outputs of memory parts 11a and 11b in accordance with first control signal S1, and a multiplexer 13b for selecting an output of multiplexer 13a or in-data in accordance with second control signal S2.

Second data error removing part 14 is formed by a register 14a for temporarily storing an output of multiplexer 13b, a register 14b for temporarily storing an output of register 14a, and a multiplexer 14c for selecting to provide the output of registers 14a and 14b in accordance with a third control signal S3.

Here, memory parts 11a and 11b are single port memories, and register 14b is a shift register having the segment sync signal byte size.

The error data removing and sync signal delaying system according to the first embodiment of the present invention constructed as above will be described by applying to a system of which segment sync signal length is m-byte, segment length is n-byte, field sync signal length is n-m byte, field length is N-segment, decoding delay within segment is d-byte and decoding delay within field is D-segment.

To begin with, the principle of removing the error data is performed in the manner to divide, as described above, each field into two areas of area 1 and area 2, so that decoded data of the area 2 section is delayed by as long as the sync signal to be provided, and that of the area 2 section is provided without delay. Thus, the decoded data of the area 2 section is once stored in the memory in the segment unit prior to being read out to be provided, and that of the area 1 section is not stored in the memory to be instantaneously provided, thereby eliminating the error data.

At this time, if the single port memory is utilized, two n-byte single port memories are required because the read/write of the decoded data as much as the segment length should be simultaneously executed.

That is, the input decoded data is stored in either one of memory parts 11a or 11b in accordance with first control signal S1. At this time, the other memory part 11a or 11b without being stored with the in-data is operated in the read mode, and the modes of memory parts 11a and 11b are shifted per segment. Also, read/write addresses Addr of memory parts 11a and 11b are generated to be different from each other in accordance with the modes of memory parts 11a and 11b. The address in case of the storing is produced by a counting value of an unshown byte counter unchanged, and the address for reading out the data is produced by using the counting value of the byte counter.

Figure 1:
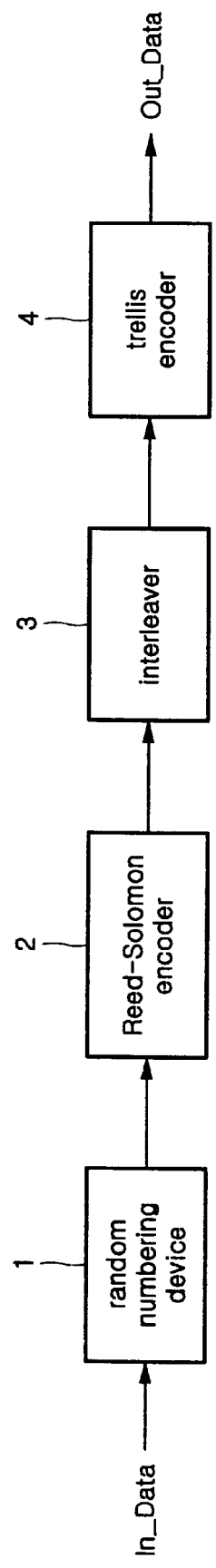
FIG. 1 is a block diagram showing a construction of a forward error correcting coder in a general DTV VSB standard.
Figure 2:
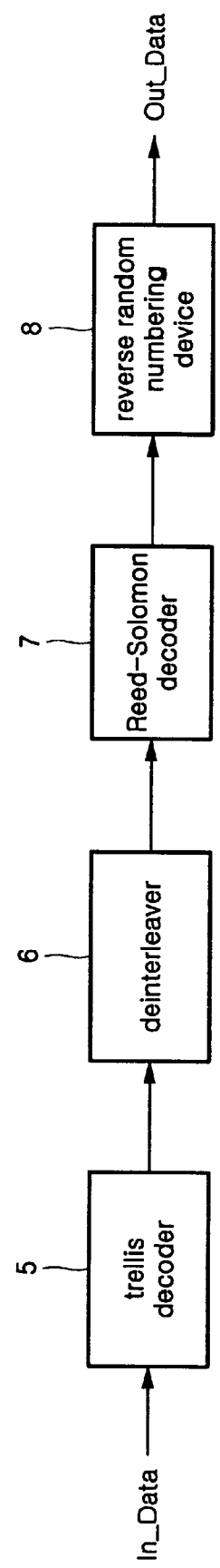
FIG. 2 is a block diagram showing a construction of a forward error correcting decoder in the general DTV of the VSB standard.
Figure 3:
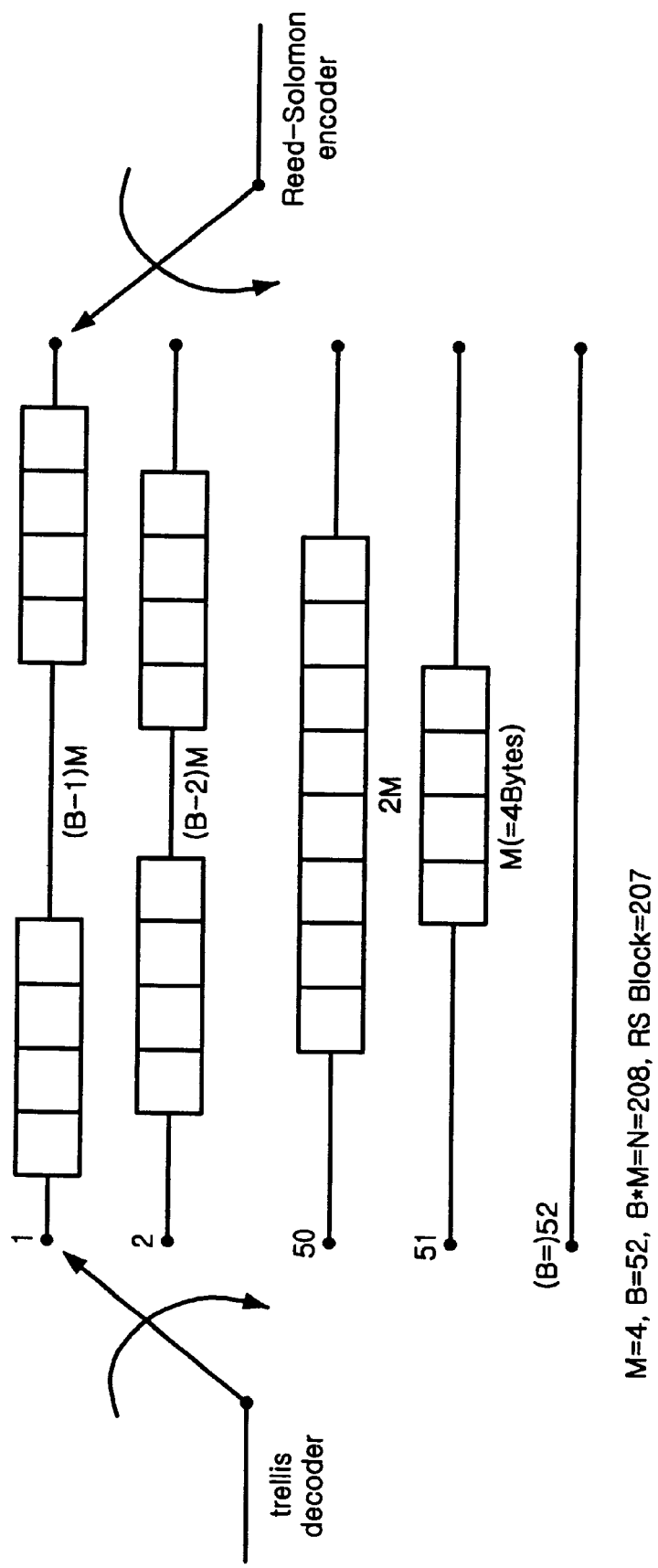
FIG. 3 is a block diagram showing a construction of the deinterleaver in the general DTV of the VSB standard.
Figure 4:
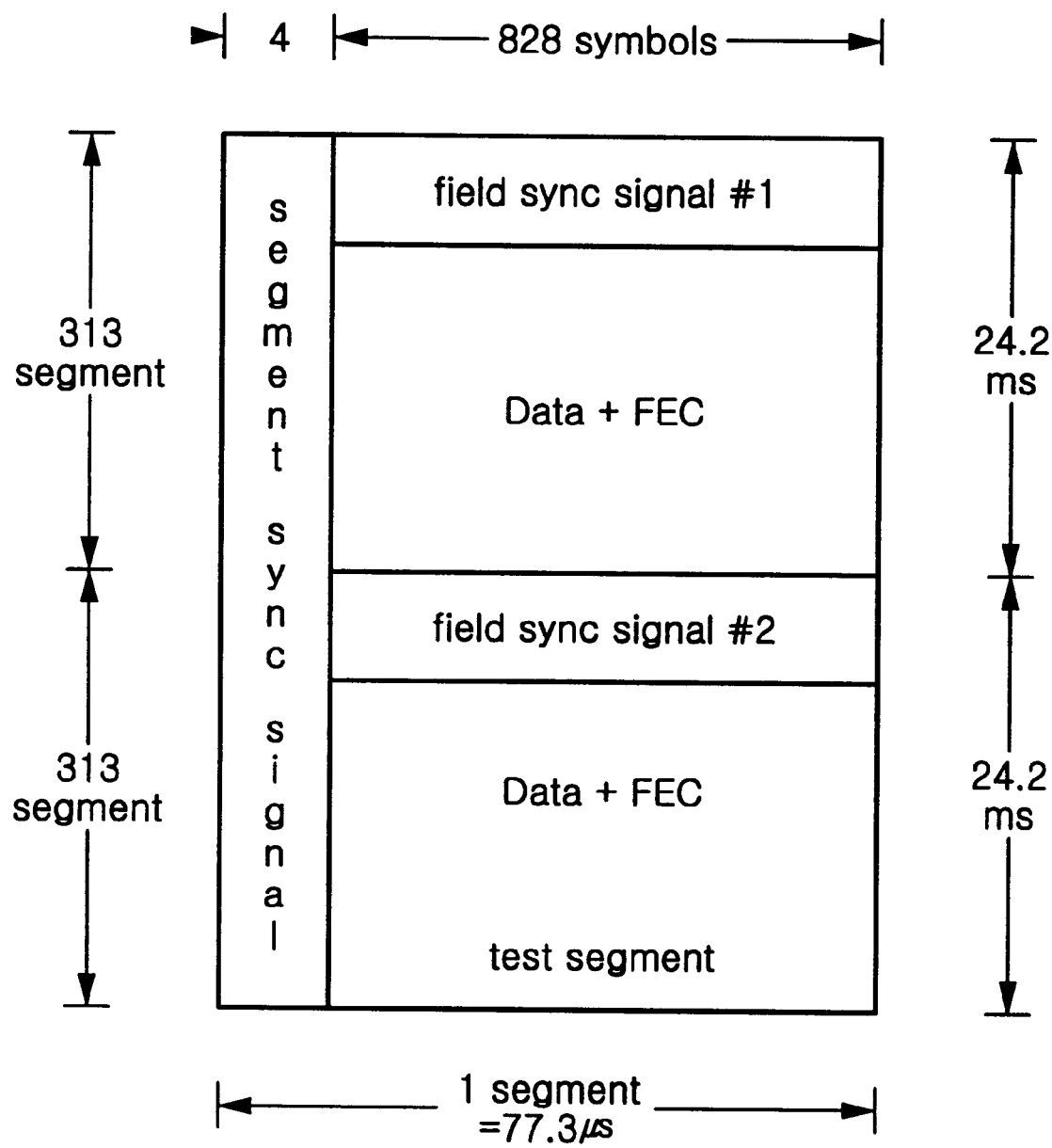
FIG. 4 shows a format of a data frame in the general DTV of the VSB standard.
Figure 5:
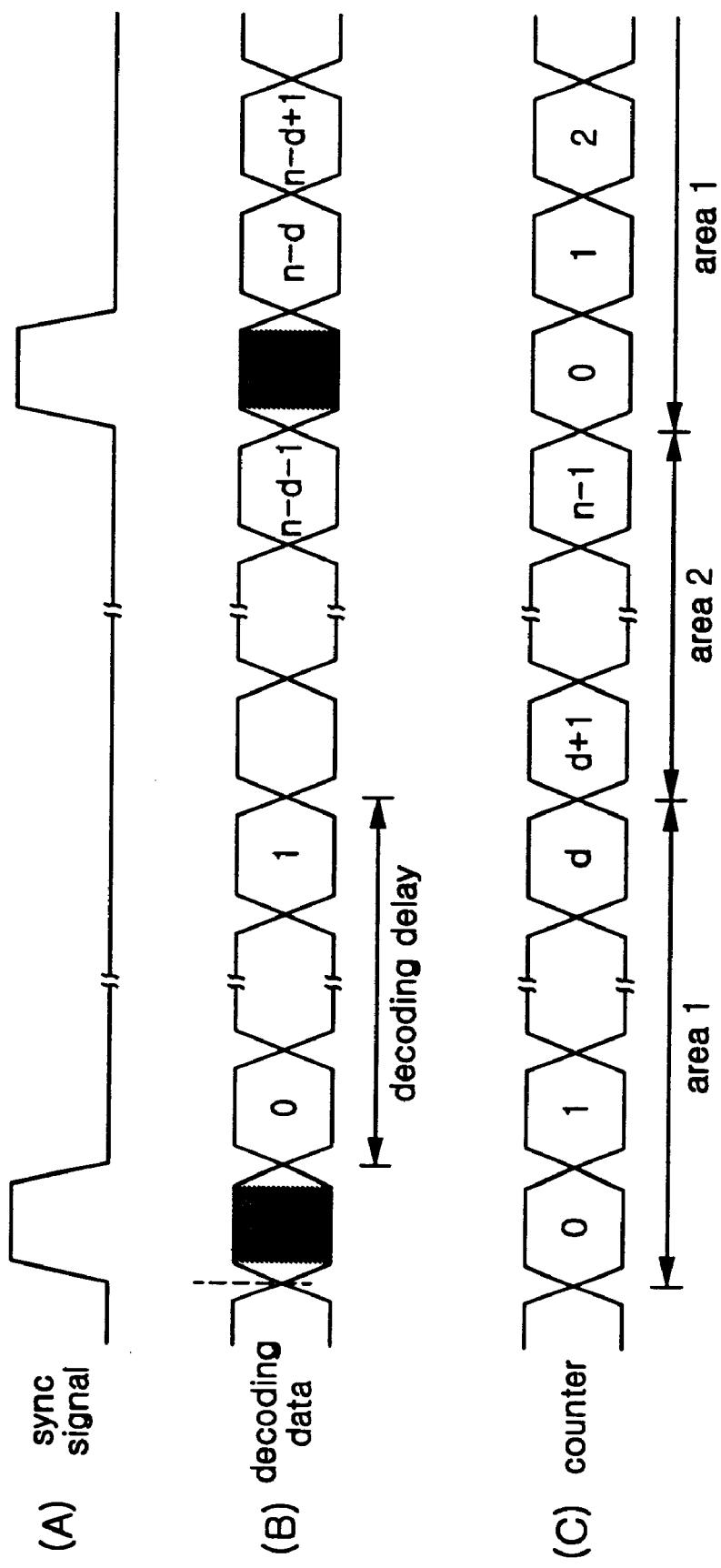
FIGS. 5A to 5C are output waveforms of the sync signal and decoded data of the general DTV of the VSB standard.

The read address generation of data becomes differed in accordance with the area division as shown in FIG. 5. At this time, the counter shown in FIG. 5C denotes the byte counter. In FIG. 5, a value obtained by adding m to the current value of the byte counter is used as the read address in the area 1, and the value of the byte counter is used as the read address unchanged in the area 2.

By doing so, the error data in the quantity of m-byte corresponding to the segment sync signal section can be eliminated. At this time, an unshown d-value detecting combination logic circuit may be connected to an output stage of the byte counter to produce the segment sync signal delayed as much as the decoding delay.

Meanwhile, the output of memory part 11a or 11b operated in the read mode is received into multiplexer 13b via multiplexer 13a in accordance with first control signal S1, and one of the inputs of multiplexer 13b is received via memory parts 11a and 11b, and the other input is directly received with the in-data. The data received via memory parts 11a and 11b is the decoded data delayed by segment for eliminating the error data in the quantity of one segment which corresponds to the field sync signal section.

Figure 7:
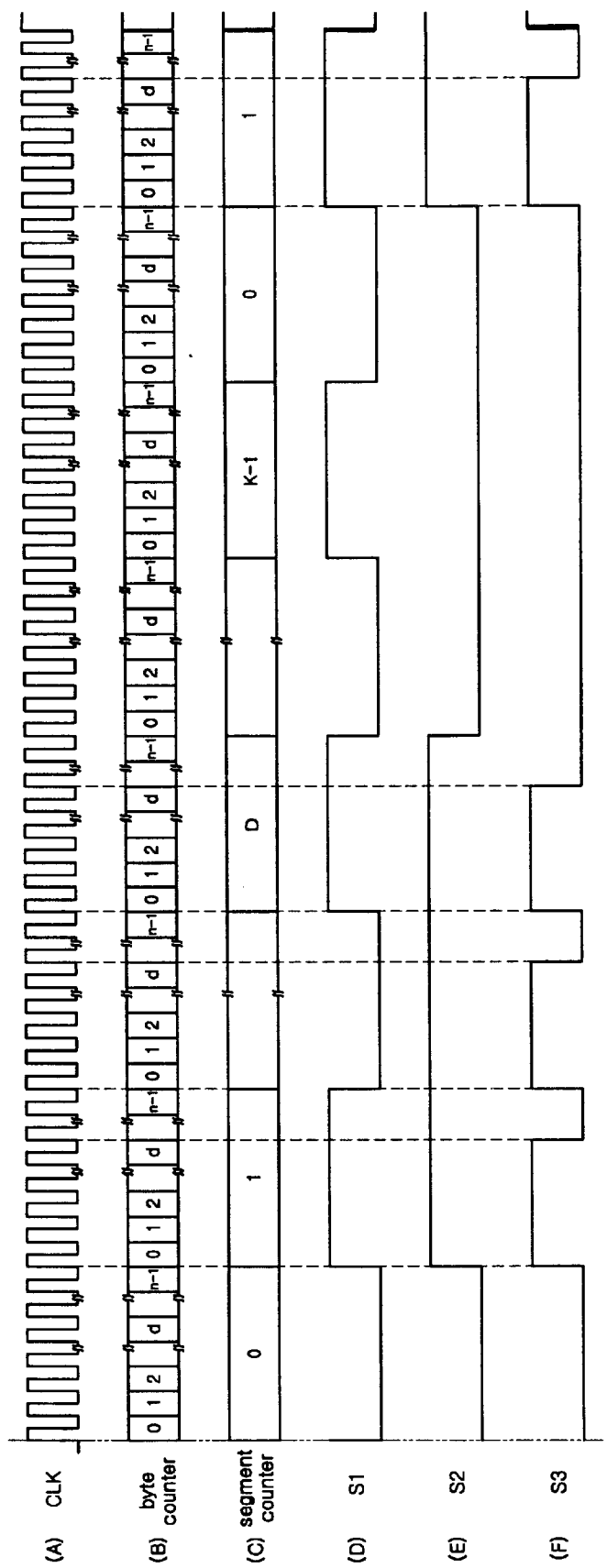
FIGS. 7A to 7F show timing charts of input/output signals of respective parts shown in FIG. 6.
Figure 8A:
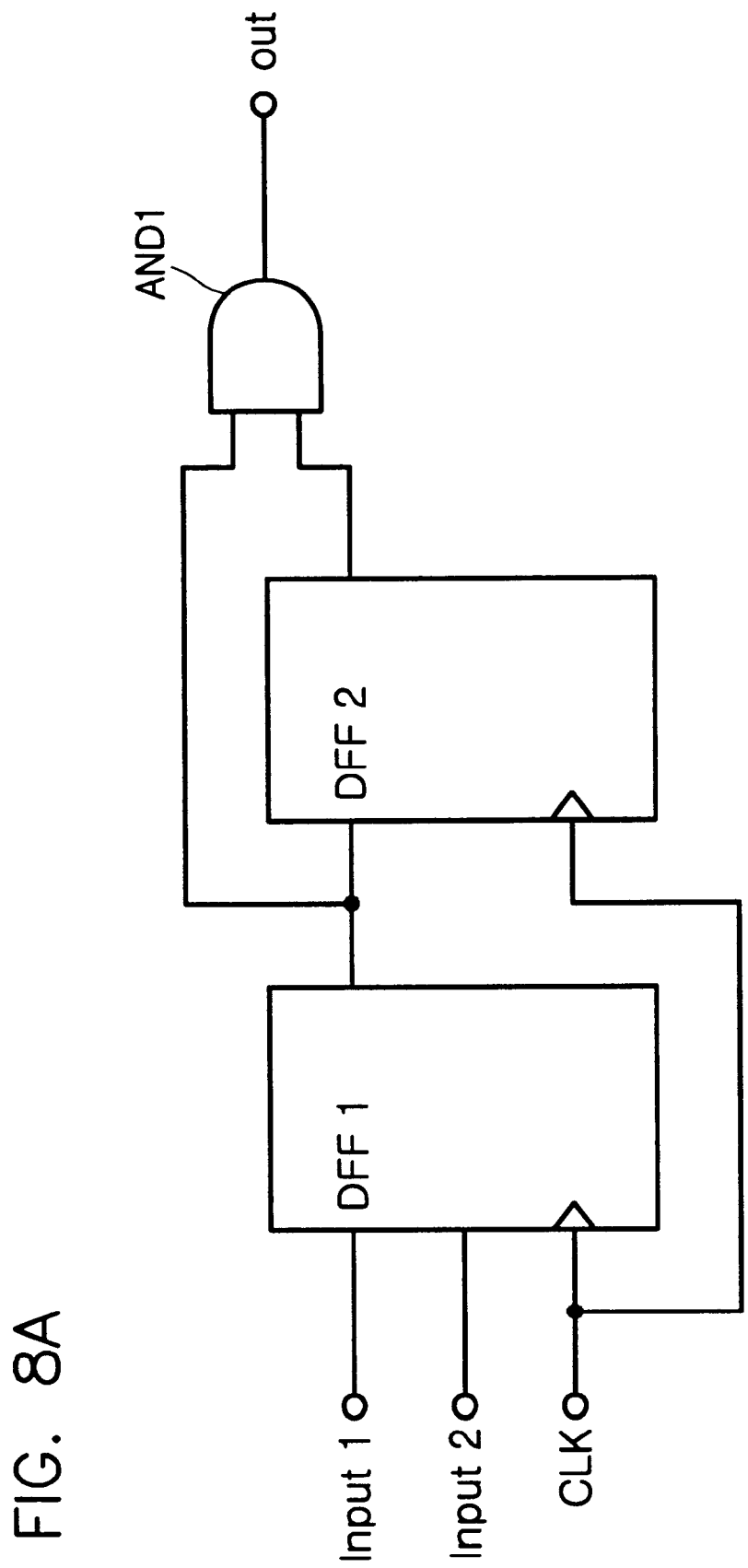
FIG. 8A is a block diagram showing a construction of the field sync delay circuit according to the present invention.

The output of multiplexer 13b is determined by second control signal S2, and the generation of second control signal S2 shown in FIG. 7 corresponds to the area division as shown in FIG. 5. In other words, referring to FIG. 5, the in-data becomes the output of second multiplexer 13b in the area 1 section, and the decoded data delayed via memory parts 11a and 11b is provided in the area 2 section. By this operation, the error data in the field sync signal section is eliminated. At this time, the field sync signal delayed as long as the decoding delay is produced by connecting a D+1 valued detecting combination logic circuit into the output stage of an unshown segment counter. Here, because there is a difference between the field sync signal and segment sync signal as long as the decoding delay within segment, the delay circuit shown in FIG. 8A is utilized to delay the field sync signal.

In the delay circuit, a D flip-flop DFF1 is supplied with the segment sync signal (input 1) delayed as long as the decoding delay as an enable signal EN, delayed field sync signal (input 2) into an input port D and a byte clock into a clock input port CLK. A D flip-flop DFF2 is supplied with the output of D flip-flop DFF1 into an input port D and the byte clock into a clock input port CLK, and the outputs of D flip-flops DFF1 and DFF2 are logically produced in an AND gate AND1.

In the delay circuit having the above-stated construction, as shown in FIG. 8B, the segment sync signal delayed as long as the decoding delay is supplied to input 1, and input 2 is received with the delayed field sync signal. Clock input port CLK is received with the byte clock. The delayed segment sync signal of input 1 delays the delayed field sync signal of input 2 as long as the decoding delay within the segment via D flip-flop DFF2 to provide the result.

Meanwhile, since the decoded data obtained by directly providing the in-data via multiplexer 13b is in the state of eliminating no error data in the segment sync section, the section of the delayed segment sync signal does not concur with the error data section. In order to remove the m-byte error data of the segment sync section, the output of multiplexer 13b is temporarily stored in registers 14a and 14b. Because the segment sync section is typically 1-byte or 2-byte or so, it is efficient to employ a register.

Register 14b is operated by the byte clock, and the outputs of registers 14a and 14b are connected to multiplexer 14c to be high only in the area 1 section shown in FIG. 5 where third control signal S3 is high. Register 14b and multiplexer 14c affect area 1 within the field when respective fields and respective segments are partitioned as shown in FIG. 5, delay the decoded data of the area 2 section within the segment as long as the m-period which is the segment sync section, and provide the decoded data of the area 1 section within the segment without involving delay, thereby removing the error data existing per segment in the area 1 within the field.

Since there is a time differential of one period between the delayed segment sync and field sync and there is a time differential of m+1 period between the segment sync and output port out of FIG. 6, the segment sync and field sync signals are required to be delayed. This can be solved by using m+2 flip-flops.

Figure 9:
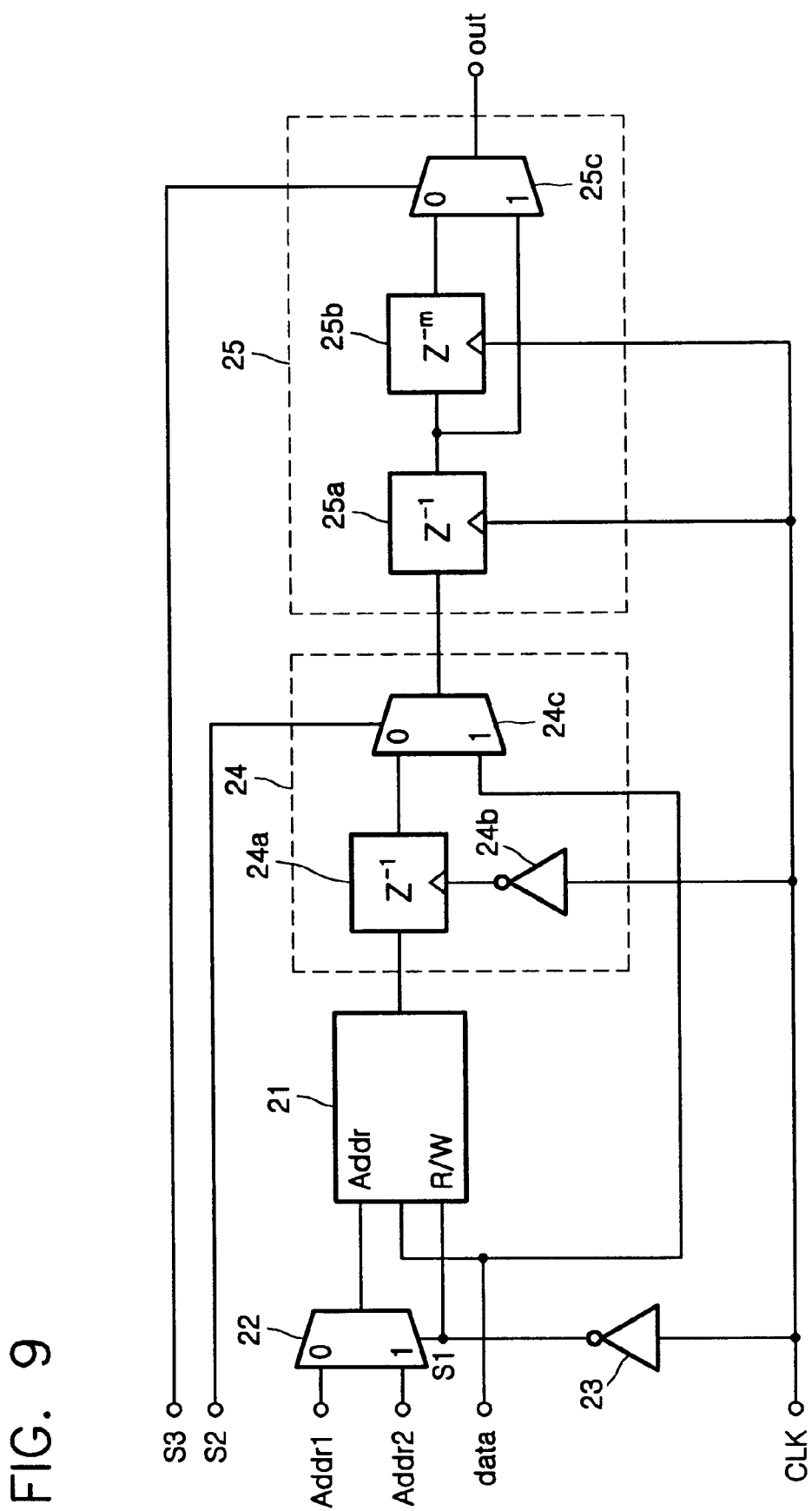
FIG. 9 shows a second embodiment of the error data removing apparatus by decoding delay in the DTV according to the present invention.

FIG. 9 shows a second embodiment of the error data removing apparatus by decoding delay in the DTV according to the present invention, which is embodied by using a principle that, when the operating clock is relatively low, only one single-port memory is employed and one byte clock period is time-divided to perform the read/write operations of the memory.

Here, while multiplexer 13a of FIG. 6 is not required, a register for temporarily storing decoded data read out during the first half-period of each clock is required. The other systems of generating read/write addresses Addr1 and Addr2 of the memory and of delaying second and third control signals S2 and S3, the segment sync signal and field sync signal are the same as those of the first embodiment.

The second embodiment of the present invention includes a memory part 21 for writing/reading in-data in accordance with a first control signal S1, a multiplexer 22 for controlling the read/write operations of memory part 21, and an inverter 23 for phase-shifting an input clock. Also, a first data error removing part 24 eliminates a data error resulting from the decoding delay due to a field sync signal by means of a second control signal S2 for removing the error data by the field sync signal, and a second data error removing part 25 eliminates a data error resulting from the decoding delay by a segment sync signal in an output of first data error removing part 24 by means of a third control signal S2 for removing the error data by the field sync signal.

First data error removing part 24 is formed by a register 24a for storing the out-data of memory part 21 for the half clock period, an inverter 24b for phase-shifting an input clock to supply the clock to register 24a and a multiplexer 24c for selecting an output of register 24a or in-data in accordance with second control signal S2.

Second data error removing part 24 is formed by a register 25a for temporarily storing an output of multiplexer 24c, a register 25b for temporarily storing an output of register 25a and a multiplexer 25c for selecting to provide the outputs of registers 25a and 25b in accordance with third control signal S3.

Here, memory part 21 is the single-port memory, and register 25b is an m-shift register that m-numbered registers are serially connected.

In the second embodiment of the present invention constructed as above, first control signal S1 for controlling the read/write operations of memory part 21 is the signal obtained by shifting input clock CLK by using inverter 23, which divides respective clocks to control the read/write operations of memory part 21.

Figure 10:
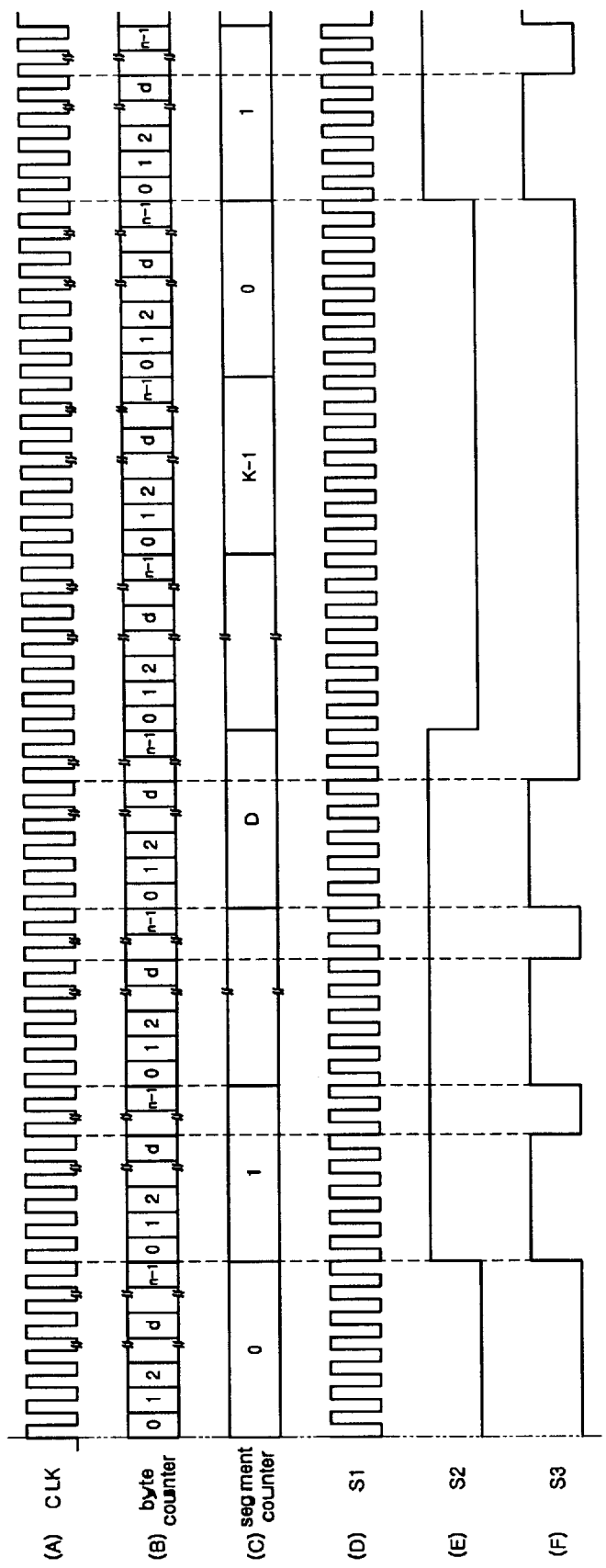
FIG. 10 shows I/O timing charts of respective parts shown in FIG. 6.

As shown in the waveform of first control signal S1 of FIG. 10D, memory part 21 is operated in the read mode during the first half period and in the write mode during the other half period. The selection of read/write addresses Addr1 and Addr2 is determined by multiplexer 22 and is first control signal S1 which is the control signal. First control signal S1 uses by shifting input clock CLK by means of inverter 23, determines the read/write mode of memory part 21, and supplies the resulting read/write address to memory part 21 via multiplexer 22.

The data supplied from memory part 21 in accordance with read/write addresses Addr1 and Addr2 and first control signal S1 is temporarily stored in register 24a to be provided via multiplexer 24c in accordance with second control signal S2, and the detailed operation of multiplexer 24c is the same as multiplexer 13b shown in FIG. 6. The operations of registers 25a, 25b and multiplexer 25c are identical to those of the first embodiment, of which detailed description will thus be omitted.

In addition, instead of repeating the read/write operations by time-dividing the single port memory as shown in FIG. 9, it can be embodied by a dual port memory of simultaneously performing the read/write operations. If the dual port memory is employed, no first control signal S1 for controlling the read/write operations of memory 21 in FIG. 9 is required, and read/write addresses Addr1 and Addr2 respectively used as the read address and write address are directly supplied to a dual port memory part 31 without passing through multiplexer 22.

Figure 11:
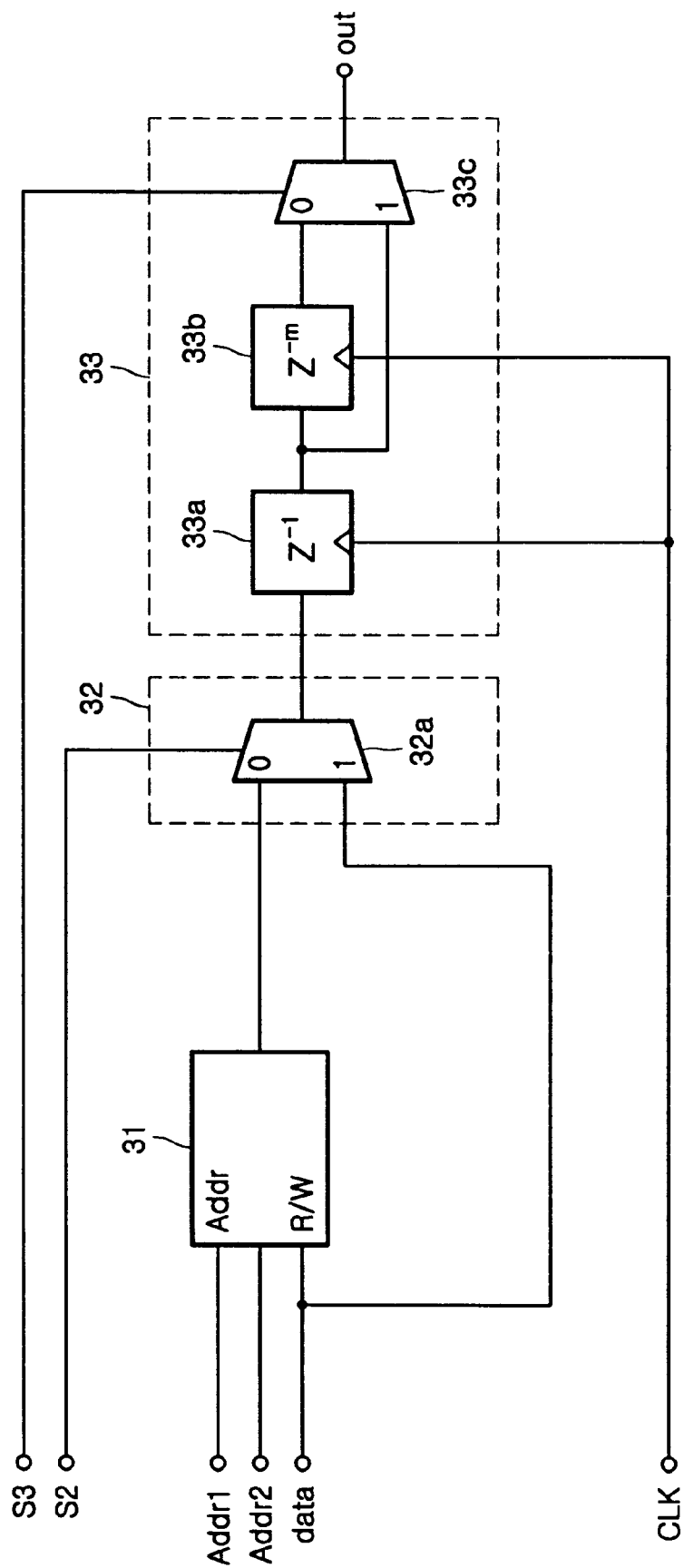
FIG. 11 shows a third embodiment of the error data removing apparatus by decoding delay in the DTV according to the present invention.

FIG. 11 shows a third embodiment of the error data removing apparatus by decoding delay in the DTV according to the present invention, which includes a memory part 31 for reading/writing in-data in accordance with read/write addresses Addr1 and Addr2, a first data error removing part 32 for eliminating a data error by a field sync signal in an output of memory part 31 in accordance with a second control signal S2 for removing error data by the field sync signal, and a second data error removing part 33 for eliminating a data error by a segment sync signal in an output of first data error removing part 32 in accordance with a third control signal S2 for removing error data by the segment sync signal.

First data error removing part 32 is formed by a multiplexer 32a for selecting the output of memory part 31 or in-data in accordance with second control signal S2. Second data error removing part 33 is formed by a register 33a for temporarily storing an output of multiplexer 32a, a register 33b for temporarily storing an output of register 33a and a multiplexer 33c for selecting to provide outputs of registers 33a and 33b in accordance with third control signal S3.

Additionally, memory part 21 is a dual port memory, and register 33b is an m-shift register that m-numbered registers are serially connected.

In the third embodiment of the present invention constructed as above, different from the first and second embodiments, memory part 31 performs the read/write operations of the in-data in accordance with the input of read/write addresses Addr1 and Addr2, and the data read out of memory part 31 or the input is externally provided in accordance with the decision of second control signal S2 in multiplexer 32a within first data error removing part 32. The data provided in this manner is supplied to second data error removing part 33. Here, the detailed operation of second data error removing part 33 is identical to these of second data error removing part 14 and 25 of first and second embodiments, of which detailed description will thus be omitted.

In the present invention as described above, the minimum memory and control logic circuit are used to remove the error data in the quantity of the segment of the field sync signal section, and the same memory is utilized to remove the error data of the segment sync section. Also, the memory is not separately used but the address generating circuit of the memory for removing the error data is used to additionally solve the task of delaying the field sync signal and segment sync signal as long as the decoding delay, thereby being effective in economizing the cost of the hardware and reducing the chip size when embodying an ASIC.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. In a DTV system involving segment decoding delay and field decoding delay by a segment sync signal and a field sync signal, an error data removing apparatus by decoding delay of said DTV system comprising:

memory parts for alternately reading/writing input decoded data in accordance with a first control signal being a read/write control signal and a read/write address;

an inverter for shifting a phase of said first control signal to constantly operate said memory parts in different modes;

a first data error removing part for eliminating a data error caused due to the decoding delay by said field sync signal among the out-data of said memory parts in accordance with a second control signal for removing said error data due to said field sync signal and said first control signal; and a second error removing part for eliminating a data error caused due to the decoding delay by said segment sync signal.

2. An error data removing apparatus by decoding delay in a DTV system as claimed in claim 1, wherein said memory parts are comprised of a single port memory.

3. An error data removing apparatus by decoding delay in a DTV system as claimed in claim 1, wherein said first data error removing part comprises:

a first multiplexer for selecting either one of said outputs of said memory parts in accordance with said first control signal; and a second multiplexer for selecting an output of said first multiplexer or in-data in accordance with said second control signal.

4. An error data removing apparatus by decoding delay in a DTV system as claimed in claim 1, wherein said second data error removing part comprises;

a first register for temporarily storing an output of said second multiplexer;

a second register for temporarily storing an output of said first register; and a multiplexer for selecting to provide either one of outputs of said registers in accordance with said third control signal.

5. An error data removing apparatus by decoding delay in a DTV system as claimed in claim 4, wherein said second register is a shift register having the segment sync signal byte size.

6. An error data removing apparatus by decoding delay in a DTV system as claimed in claim 1, further comprising byte and segment counters for generating said address and first to third control signals.

7. An error data removing apparatus by decoding delay in a DTV system as claimed in claim 1, further comprising:

a first D flip-flop received with the segment sync signal delayed as said decoding delay as an enable signal, the delay field sync signal into an input port, and a byte clock into a clock input port;

a second D flip-flop having an input port received with an output of said first D flip-flop and a clock input port received with said byte clock; and an AND gate for performing logic product of outputs of said D flip-flops, whereby said delayed field sync signal is delayed as long as the decoding delay within the segment.

8. In a DTV system involving segment decoding delay and field decoding delay by a segment sync signal and a field sync signal, an error data removing apparatus by decoding delay of said DTV system comprising:

a memory part for reading/writing in-data in accordance with a first control signal being a read/write control signal;

a multiplexer for selecting either one of read/write addresses in accordance with said first control signal to provide an address for controlling the read/write operation of said memory part;

an inverter for shifting a phase of an input clock to provide said first control signal;

a first data error removing part for eliminating a data error caused due to the decoding delay by said field sync signal in the output of said memory part in accordance with a second control signal for removing said error data due to said field sync signal; and a second error removing part for eliminating a data error caused due to the decoding delay by said segment sync signal in the output of said first data error removing part in accordance with a third control signal for removing said error data due to said segment sync signal.

9. An error data removing apparatus by decoding delay in a DTV system as claimed in claim 8, wherein said memory part is comprised of a single port memory.

10. An error data removing apparatus by decoding delay in a DTV system as claimed in claim 8, wherein said first data error removing part comprises:

a register for storing out-data of said memory part for a half period of said input clock;

an inverter for shifting a phase of said input clock to provide it to said register as a clock; and a multiplexer for selecting an output of said register or in-data in accordance with said second control signal.

11. An error data removing apparatus by decoding delay in a DTV system as claimed in claim 8, wherein said second data error removing part comprises:

a first register for temporarily storing an output of said multiplexer;

a second register for temporarily storing an output of said first register; and a multiplexer for selecting to provide either one of outputs of said registers in accordance with said third control signal.

12. An error data removing apparatus by decoding delay in a DTV system as claimed in claim 11, wherein said second register is a shift register having the segment sync signal byte size.

13. An error data removing apparatus by decoding delay in a DTV system as claimed in claim 8, further comprising byte and segment counters for generating said addresses and first to third control signals.

14. An error data removing apparatus by decoding delay in a DTV system as claimed in claim 8, further comprising:

a first D flip-flop received with the segment sync signal delayed as said decoding delay as an enable signal, the delay field sync signal into an input port, and a byte clock into a clock input port;

a second D flip-flop having an input port received with an output of said first D flip-flop and a clock input port received with said byte clock; and an AND gate for performing logic product of outputs of said D flip-flops, whereby said delayed field sync signal is delayed as long as the decoding delay within the segment.

15. In a DTV system involving segment decoding delay and field decoding delay by a segment sync signal and a field sync signal, an error data removing apparatus by decoding delay of said DTV system comprising:

a memory part for reading/writing in-data in accordance with read/write addresses;

a first data error removing part for eliminating a data error caused due to the decoding delay by said field sync signal in the output of said memory part in accordance with a second control signal for removing said error data due to said field sync signal; and a second error removing part for eliminating a data error caused due to the decoding delay by said segment sync signal in the output of said first data error removing part in accordance with a third control signal for removing said error data due to said segment sync signal.

16. An error data removing apparatus by decoding delay in a DTV system as claimed in claim 15, wherein said memory part is comprised of a dual port memory.

17. An error data removing apparatus by decoding delay in a DTV system as claimed in claim 15, wherein said first data error removing part comprises a multiplexer for selecting said output of said memory part or in-data in accordance with said second control signal.

18. An error data removing apparatus by decoding delay in a DTV system as claimed in claim 15, wherein said second data error removing part comprises:

a first register for temporarily storing an output of said first data error removing part;

a second register for temporarily storing an output of said first register; and a multiplexer for selecting to provide either one of outputs of said registers in accordance with said third control signal.

19. An error data removing apparatus by decoding delay in a DTV system as claimed in claim 18, wherein said second register is a shift register having the segment sync signal byte size.

20. An error data removing apparatus by decoding delay in a DTV system as claimed in claim 15, further comprising byte and segment counters for generating said addresses and first to third control signals.

21. An error data removing apparatus by decoding delay in a DTV system as claimed in claim 15, further comprising:

a first D flip-flop received with the segment sync signal delayed as said decoding delay as an enable signal, the delay field sync signal into an input port, and a byte clock into a clock input port;

a second D flip-flop having an input port received with an output of said first D flip-flop and a clock input port received with said byte clock; and an AND gate for performing logic product of outputs of said D flip-flops, whereby said delayed field sync signal is delayed as long as the decoding delay within the segment.

22. In an error data removing method by decoding delay in a DTV system having a data frame format formed by a field of a segment sync signal m-byte, segment n-byte, field sync signal n-m byte and N segment and involving segment decoding delay d and field decoding delay D, said error data removing method by decoding delay of said DTV comprising the steps of:

dividing respective segments or respective fields into area 1 and area 2 using a starting point of decoded data as a reference;

providing the decoded data of said area 1 section without involving delay; and providing the decoded data of said area 2 section by delaying as long as a sync signal.

23. An error data removing method by decoding delay in a DTV system as claimed in claim 22, wherein, when said segment area is divided, the segment area 1 is comprised from 0 to d and the segment area 2 is comprised from d+1 to n−1.

24. An error data removing method by decoding delay in a DTV system as claimed in claim 22, wherein, when said field area is divided, the field area 1 is comprised from 0 to D−1 and the field area 2 is comprised from D to N−1.

25. An error data removing method by decoding delay in a DTV system as claimed in claim 22, wherein, when said field area is divided, the field area 1 is comprised from 0 to D and the field area 2 is comprised from D+1 to N−1.

* * * * *